Patented July 2, 1946

2,403,344

UNITED STATES PATENT OFFICE 2,403,344

COMPOSITION OF MATTER AND METHOD OF MAKING SAME

Melvin De Groote, University City, Mo., assignor to Petrolite Corporation, Ltd., Wilmington, Del., a corporation of Delaware No Drawing. Original application June 26, 1944, Serial No. 542,238. Divided and this application February 23, 1945, Serial No. 579,503

7 Claims. (Cl. 260—404)

This invention relates to a new chemical product or composition of matter, my present application being a division of my co-pending application Serial No. 542,238, filed June 26, 1944.

The main object of my invention is to provide a new chemical compound or product that is particularly adapted for use as a demulsifier for crude oil emulsions, but which is also capable of various other uses.

Another object of my invention is to provide a practicable method for manufacturing said new chemical product or compound.

The new material herein described, particularly when employed as a demulsifier, consists of sub-resinous reaction products derived by reaction between (A) A polycarboxy acid fractional ester radical having (a) an unreacted carboxyl radical, and (b) a detergent-forming monocarboxy acid radical having at least 8 and not more than 32 carbon atoms, said detergent-forming acid radical being an integral part of a detergent-forming acid compound consisting of acids, monohydric alcohol esters and polyhydric alcohol esters; and (B) A basic esterified etheraminoalcohol of the formula:

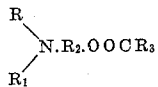

in which R is an ether radical having as an integral part thereof, a hydrocarbon radical containing 8 carbon atoms and not more than 32 carbon atoms, and selected from the class consisting of alkyl radicals, alicyclic-alkyl radicals, and aralkyl radicals, in which a carbon atom chain is interrupted at least once by an oxygen atom, and at least one such carbon atom attached to an ethereal oxygen atom is an acyclic carbon atom; $R_1$ is a member of the class of radicals consisting of (a) The same radical as R without the lower limitation of 8 carbon atoms;

(b) Non-aryl hydrocarbon radicals having 7 carbon atoms or less, and in turn, selected from the group of alkyl radicals, aralkyl radicals and alicyclic radicals;

(c) Hydroxyalkyl radicals and hydroxyalkoxy radicals, in which the alkylene radical contains less than 8 carbon atoms; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxy polyglycol radicals, in which any alkylene radicals present are selected from the group consisting of ethylene, propylene, butylene and methylbutylene, and $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

The amino nitrogen atom must be free from directly linked acyl radicals or aryl radicals. Stated another way, the nitrogen atom must be a basic amino nitrogen atom. See "Richter, Textbook of Organic Chemistry, 2nd edition, page 253."

Compounds of the kind above described are obtained from hydroxylated etheramines by reaction with low molal monocarboxy acids having less than 8 carbon atoms. The hydroxylated derivatives are conveniently obtained, in many instances, from etheramines having either 1 or 2 residual amino hydrogen atoms; for instance, a compound such as

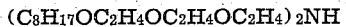

may be reacted with an oxyalkylating agent having a reactive ethylene oxide ring. As typical examples of applicable compounds may be mentioned glycerine epichlorhydrin, glycide alcohol, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc.

As to a process for preparing amines of the kind herein contemplated as reactants for combination with low molal monocarboxy acids, reference is made to U. S. Patents No. 2,334,517, to Tucker, dated November 16, 1943; and No. 2,325,514, to Hester, dated July 24, 1943; and French Patent No. 837,604, dated February 15, 1939, to I. G. Farbenindustrie, A.-G.

The aforementioned United States Patent No. 2,325,514 is concerned with compounds of the formula type:

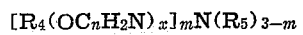

wherein $R_4$ is an aliphatic hydrocarbon group of less than 13 carbon atoms, $C_nH_{2n}$ represents an alkylene group in which $n$ is an integer having a value of 2 to 4, inclusive, $x$ is an integer of at least 1, $m$ is an integer having a value of 2 to 3, inclusive, and $R_5$ is a member of the class consisting of hydrogen, hydroxyalkyl, and hydrocarbon groups.

In the instant case the utility of the product is not limited to $R_4$ in the previous formula being necessarily aliphatic, and the number of carbon atoms may be 13 or more. For instance, in a subsequent example where reference is made to octyl bromide, decyl bromide or octadecyl bromide, may be used, although the reaction takes place more slowly as one employs a bromide of higher molecular weight. One may use alkylated benzyl chlorides in which alkyl groups, for instance, ethyl, propyl, amyl or octyl groups are introduced into the aromatic nucleus. Similar products may be obtained from substituted naphthalenes by reaction with formaldehyde, and hydrochloric acid, so as to obtain the polycyclic analogs. Such procedure, involving chloromethylation is well known. The following will serve as an illustration of the reactant described immediately preceding:

Etheramine

Example 1

A mixture of 82 parts of triethanolamine, 66 parts of sodium hydroxide; and 318 parts of normal octyl bromide was heated at 130°–140° C., on an oil bath for four hours. The reaction mixture was then cooled, washed with water, dried over sodium sulfate, and distilled under reduced pressure. A fraction distilling between 165° C. and 185° C. at 3 mm. pressure was chiefly

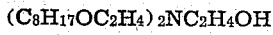

$(C_8H_{17}OC_2H_4)_2NC_2H_4OH$ with a small amount of the mono-octyloxyethyl ethanolamine. The fraction distilling between 185° C. and 205° C. was practically pure bis-octyloxyethyl ethanolamine.

Etheramine

Example 2

Decyl bromide is substituted for octyl bromide in the preceding example.

Other suitable reactants are described in U. S. Patent No. 2,334,517, dated November 16, 1943, to Tucker. Said Tucker patent is concerned with compounds of the formula:

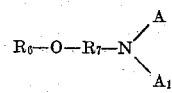

wherein $R_6$ is an alkyl radical having 8 to 22 carbon atoms, $R_7$ is a hydroxy alkylene radical having not more than 4 carbon atoms connected to $R_6$ through an ether linkage. A is selected from the group consisting of hydrogen, an alkyl radical and an alkylol radical, and $A_1$ is an alkylol radical, the radicals represented by A and $A_1$ each having not more than 4 carbon atoms.

Typical compounds described in the aforementioned Tucker patent and the method of making same may be illustrated by the following brief description, which is substantially verbatim as it appears in the aforementioned Tucker patent:

Etheramine

Example 3

In a known manner lauryl alcohol is reacted with epichlorhydrin in the presence of a suitable catalyst such as stannic chloride, antimony pentachloride, boron trifluoride, or perchloric acid, to produce lauryl monochlorhydrin ether. Although good yields of lauryl monochlorhydrin ether are obtained under normal conditions of reaction, it may be desired to obtain a substantially pure product, in which case the products of the above reaction may be dissolved in ether and washed with water, and subsequently fractionally distilled.

Fifty-six parts of the lauryl monochlorhydrin ether thus formed are mixed with 23 parts of diethanolamine and the mixture is heated with stirring for about 2½ hours at 170° to 180° C. Residual hydrochloric acid may then be eliminated by boiling the reaction mix with caustic soda solution for a brief period. If desired, this product may be purified by washing an ether solution of same with water, following which the product may be recovered from the ether solution.

A product prepared in accordance with this example consisted predominantly of a compound having the formula:

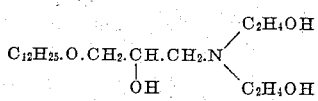

Etheramine

Example 4

The lauryl monochlorhydrin ether prepared in Example 3, is converted to lauryl glycidyl ether by refluxing at atmospheric pressure a mixture of 60 parts of the monochlorhydrin ether with 12 parts of sodium hydroxide in 20 parts of water. The ether is washed with water and subsequently recovered.

To 48 parts of the lauryl glycidyl ether are added 20 parts of morpholine, and the mixture is heated to refluxing at 150 to 160° C., under a blanket of nitrogen. After the reaction has reached substantial completion, as is indicated when a sample of the reaction mix dissolves to a clear solution in a normal hydrochloric acid solution, the excess or unreacted morpholine may be removed by continuing the heating under vacuum and passing a stream of nitrogen gas therethrough. A product prepared in accordance with the above procedure will closely correspond to one having the following formula:

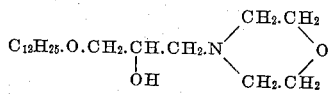

Etheramine

Example 5

Tetradecyl glycidyl ether is prepared in a manner similar to that employed in the preparation of lauryl glycidyl ether above described.

To 54 parts of the tetradecyl glycidyl ether are added 49 parts trimethylolaminomethane corresponding to the ratio of 1 mole of ether to 2 moles of amine, and the mixture is stirred while slowly heating to 170° C. Reaction is allowed to proceed at 170° to 180° C. for about an hour, after which the product is freed from excess amine by washing an ether solution of the reaction product with brine. A product so prepared consisted predominantly of a compound having the formula:

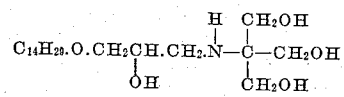

Additional reactants are described in the previously mentioned French Patent No. 837,604, dated February 15, 1939, to I. G. Farbenindustrie. Said French patent is concerned with the preparation of condensation products produced by reacting compounds containing at least one alcoholic group bound to a basic nitrogen atom in the presence of alkaline metallic compounds, with compounds of the formula X—R₈ in which R₈ equals an alkyl, cycloalkyl, aralkyl, aryl, or a heterocyclic radical, and X is a halogen atom or a group capable of being replaced. Particular reference is made to that part of the aforementioned French patent which is concerned with the preparation of a product of the following formula:

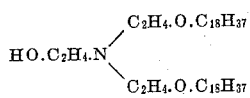

Similarly, other directions are concerned with the production of products of the formula type:

Particular attention is directed to the French patent, for the reason that it illustrates compounds in which the high molal groups substituted for aminohydrogen atoms may contain as many as 32 carbon atoms, and may contain cyclic structures of various kinds, as enumerated in the first claim of said French patent.

The amino nitrogen atom must be free from directly linked acyl radicals or aryl radicals. Stated another way, the nitrogen atom must be a basic amino nitrogen atom. See "Textbook of Organic Chemistry," Richter, 2nd edition, p. 253.

Previous reference to French Patent No. 837,604 is concerned with manufacture of etheramines from high molal halides, such as chlorides or bromides. Although such high molal halides can be obtained in various ways, they are most conveniently obtained from alcohols, which, in turn, are obtained from high molal acids. Such alcohols may be produced from naphthenic acids, resin acids, fatty acids, oxidized petroleum acids, or the like, by converting the acid into the ester, preferably the ethyl ester or the like, and then converting the ester into the alcohol. Such alcohols, derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted as indicated in the aforementioned French Patent No. 837,604. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, such amines include a hydroxylated hydrocarbon radical.

In view of what has been said, it will be noted that the group introduced into the amine molecule in a manner so as to involve at least one ether linkage and derived at least hypothetically from an acid, is really the carbon atom chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom or a small number of hydrogen atoms have been replaced by the hydroxyl radical; for instance, the hydroxy hydrocarbon radical which would be supplied by ricinoleic acid, hydroxystearic acid, dihydroxystearic acid, or the like. In the present instance such usage seems eminently correct, in that the hydrocarbon radical supplies the hydrophobe portion of the amine, and this hydrophobe portion is not changed markedly by the presence of 1 or 2 hydroxyl groups, as are present in the case of ricinoleic acid, hydroxystearic acid, or the like; and such hydroxyl groups are essentially non-functional, in that they are not relied upon to supply points of chemical activity, as far as the herein contemplated compounds are concerned. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon" is intended to include the hydroxyhydrocarbon type of the kind in which the hydroxyl group does not materially reduce the hydrophobe character of the hydrocarbon group, as, for example, the group or radical which would be obtained from ricinoleic acid. The presence of such hydroxyl radical would require an extra mole of carboxy acid, to insure an ester radical of the kind hereinafter described.

In addition to synthetic carboxy acids obtained by the oxidation of paraffins or the like, there is the somewhat analogous class obtained by treating carbon dioxide or carbon monoxide in the presence of hydrogen or an olefine, with steam, or by causing a metallic alkoxide or a halogenated hydrocarbon to react with chloracetic acid or with potassium cyanide, and saponifying the product thus obtained. Such products or mixtures thereof, having at least 8 and not more than 32 carbon atoms and having at least one carboxy group or the equivalent thereof, are as suitable for use as the conventional detergent-forming monocarboxy acids, and another analogous class equally suitable, is the mixture of carboxylic acids, obtained by the alkali treatment of alcohols of higher molecular weight formed in the catalytic hydrogenation of carbon monoxide. The synthetic carboxy acids so obtained can be converted into high molal ether amines by the same procedure as employed for the conversion of other carboxy acids.

Reference has previously been made to the fact that such amines may be treated with oxyalkylating agents and such agents are preferably selected from members having not over 5 carbon atoms, such as ethylene oxide, propylene oxide, butylene oxide, methylbutylene oxide, or glycide. Similarly, the amine which is converted into an alkoxide may be treated with an oxyalkylating agent and then converted into the alkoxide. For instance, triethanolamine might be treated with metallic sodium or sodium hydroxide so as to convert it into the alkoxide, or triethanolamine might be treated with 1 to 15 moles of ethylene oxide, propylene oxide and the like and then converted into the alkoxide for further reaction. It is to be noted that the same oxyalkylating agent need not be employed throughout the entire process. This applies to an oxyalkylating step whenever used.

Having obtained suitable high molal hydroxylated etheramines of the kind previously described, such products are subjected to esterification with low molal monocarboxy acids having 7 carbon atoms or less. Some of such acids have been previously described in characterizing the acyl radical R₃CO. Additional examples of the hydroxylated type have been mentioned. Other suitable cyclic acids include furoic, unsaturated acids, acrylic, crotonic, tiglic, etc.

The esterification reactions are conducted in the usual manner. In such instances where there are two polyglycol radicals present, one may introduce a low molal acyl radical as a substituent for each terminal hydrogen atom. It is my preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent such as an anhydride or other suitable derivatives.

In the instance of acids having boiling points in excess of 175° C., for instance, normal caproic acid, it is my preference to add a stoichiometric equivalent and conduct the reaction until the amount of water eliminated is equal to, or almost equal to, the theoretical yield. Hydroxyacetic acid may be employed in the same manner.

In the following examples, reference is made to the use of certain low molal acids. Actually, the esterification reaction can be accelerated by the use of the anhydride, i. e., using one mole of the anhydride to replace 2 moles of acid, except in such instance where there is no objection to excess acid, and where the excess acid or excess anhydride is subsequently removed, one may replace each mole of acid by 1 mole of anhydride. Particular reference is concerned with the use of acetic anhydride, propionic anhydride, n-butyric anhydride, isobutyric anhydride, n-valeric anhydride, n-caproic anhydride, and particularly the last five, where the boiling points of the anhydrides vary from 169 to 242° C. When the corresponding acid is formed, such acid may serve as a reactant in the esterification reaction, or can be removed by vacuum distillation. Reference has been made to the acids, only because they are more generally available, but where the acyl chloride is available, the anhydride can be obtained from the acyl chlorides and the salt, or by other suitable means.

It has been pointed out that the herein contemplated hydroxylated etheramines used as reactants, are basic in character. Thus, the initial reaction between the amine and the low molal carboxy acid results in salt formation. The esterification reaction involved the elimination of water from the salt. However, the esterified amine herein contemplated is still basic in character and combines with acids, particularly inorganic acids to form salts, and this is pointed out subsequently in greater detail. Reference to the amines includes the anhydro base, the hydrated base, i. e., the ammonium form, or any suitable salt, including salts of the various low molal carboxy acids herein contemplated as reactants. This means, among other things, where an excess of the low molal acid or anhydride is used for esterification, as much as a mole of such acid may be retained, insofar that the esterified high molal amino-polyglycol may be in essence a salt and not the anhydride base. The salts of the low molal acids tend to revert to the free base and the acid itself under such conditions which tend to remove the acid, i. e., vacuum distillation. The salt form, particularly the salts of the low molal carboxy acids, are preferably satisfactory for the purpose herein contemplated and when dissolved in solutions of stronger acids such as sulfuric acid, hydrochloric acid, phosphoric acid, nitric acid, etc., and acid exchange reaction takes place, and such solution may be particularly effective for those purposes wherein an acidic combination is indicated.

Previous reference was made to the fact that etheramines containing either one or two amino hydrogen atoms can be treated with oxyalkylating agents having a reactive ethylene oxide ring. Such elimination of any amino hydrogen atom serves two purposes: in the first place, the formation of amides are eliminated, and in the second place, if a reactive hydroxyl radical were not previously present, it is so supplied for reaction with a low molal carboxy acid or the like.

It is to be noted that the same oxyethylation agent need not be employed throughout the entire oxyethylation process. For instance, the secondary amine dioctylamine might be reacted with 1 mole of ethylene oxide, and 2 moles of propylene oxide, or such compound might be treated with 1 mole of glycide and then with 2 or 4 moles of ethylene oxide. It would be equally feasible to use 2 moles of ethylene oxide and then one mole of glycide. This same procedure could be applied just as effectively to primary amines. Its special significance is as follows: If a secondary amine indicated by

is treated with 2 moles of ethylene oxide to give

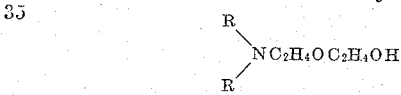

such product could then be treated with 1 mole of glycide to give a diol group, as follows:

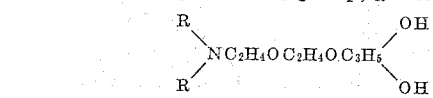

Such product has the advantage that after being reacted with a low molal monocarboxy acid, there is present an available hydroxy radical for further reaction.

Previous reference has been made to the fact that many of the amines herein contemplated as reactants may be considered conveniently as derivatives of high molal monocarboxy acids, and particularly higher fatty acids. Some of these higher fatty acids, such as hydroxystearic acid, ricinoleic acid, dihydroxystearic acid, dichlororicinoleic acid, etc., may contain at least 1 hydroxyl radical. If such products are converted into amines, the radicals R in the formulae immediately preceding, also include an additional alcoholic hydroxyl radical.

As will be indicated hereafter, the low molal acid which reacts with an alcoholic hydroxyl group may also in turn contain a reactive hydroxyl radical, as in the instance of lactic acid or hydroxyacetic acid, or the like.

In regard to the oxyalkylation of high molal amines without such amines being etheramines, attention is directed to the various patents. For instance, reference is made to U. S. Patent No. 2,174,762, dated October 3, 1939, to Schuette et al. Such patent is concerned with oxyethylation of amines sufficient to produce water solubility. In the present instance the number of recurring ether linkages in any single chain are preferably limited to 3 and water solubility may or may not occur. In other words, an oxyethylated high molal amine which is water-insoluble may serve as an intermediate reactant.

See also U. S. Patent No. 2,195,194, dated March 26, 1940, to Ulrich et al. As to methods which can be readily adapted for the oxyalkylation of high molal amines, as herein contemplated, see U. S. Patent No. 2,275,470, dated March 10, 1942, to Ruark, and U. S. Patent No. 2,337,004, dated December 14, 1943, to Schwoegler.

The following reactions are purely by way of illustration and the description is substantially that appearing in the above mentioned patents. Etheramines have been substituted for the reactants therein noted, but other reacting conditions can be maintained without change, insofar that the presence of the ether linkage does not affect reactivity towards the reactants employed for oxyalkylating.

HIGH MOLAL ETHERAMINO-POLYGLYCOL

Example 1

1 pound mole of an amine of the following composition:

$$(C_8H_{17}OC_2H_4OC_2H_4OC_2H_4)_2NH$$

is caused to react with 1 molecular proportion of epichlorhydrin which is added to the reaction mixture in small proportions, after which 2 molecular proportions of ethylene oxide are then brought into reaction at 0° C., in the presence of 0.5% of sodium ethylate. The reaction can also be conducted conveniently, if suitable caution is employed and at the same temperature, or slightly higher temperature, by using glycide instead of the epichlorhydrin. This has the advantage that no hydrochloric acid is liberated to form a salt.

HIGH MOLAL ETHERAMINO-POLYGLYCOL

Example 2

The secondary amine used in the prior example is replaced by 1 pound mole of

The above amine may be esterified without a prior oxyalkylation step, but preferably, is oxyalkylated in the same manner as the secondary amine in the prior example.

HIGH MOLAL ETHERAMINO-POLYGLYCOL

Example 3

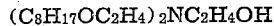

is prepared according to the directions previously noted, and used as such, or after reaction with 3 to 9 moles of ethylene oxide in the manner previously described.

HIGH MOLAL ETHERAMINO-POLYGLYCOL

Example 4

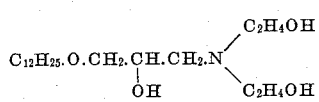

is used instead of the amine described in Example 1 preceding. 4 moles of ethylene oxide are used instead of 2 moles of ethylene oxide. Such an amine may be esterified without the prior oxyalkylation step.

HIGH MOLAL ETHERAMINO-POLYGLYCOL

Example 5

An amine of the following composition is prepared in accordance with previous directions:

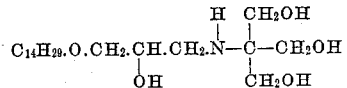

The above amine may be used as such, or after reaction with 4 to 12 moles of ethylene oxide in the previously described manner.

HIGH MOLAL ETHERAMINO-POLYGLYCOL

Example 6

An amine of the following composition:

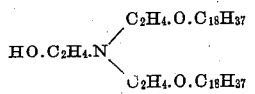

is reacted in the manner described under the heading "Example 5," immediately preceding, and may also be used directly for esterification without oxyalkylation.

HIGH MOLAL ETHERAMINO-POLYGLYCOL

Example 7

is obtained in accordance with previous directions, and used as such, or after being subjected to oxyethylation with 2 to 6 moles of ethylene oxide.

Having obtained suitable high molal hydroxylated etheramines of the kind previously described, such products are subjected to esterification with low molal monocarboxy acids having 7 carbon atoms or less. Some of such acids have been previously described in characterizing the acyl radical $R_3CO$. Additional examples of the hydroxylated type have been mentioned. Other suitable acids include cyclic acids such as furoic, and unsaturated acids, such as acrylic, crotonic, tiglic, etc.

The esterification reactions are conducted in the usual manner. In such instances where there are two polyglycol radicals present, one may introduce a low molal acyl radical as a substituent for each terminal hydrogen atom. It is my preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent, such as an anhydride or other suitable derivative.

In the instance of acids having boiling points in excess of 175° C., for instance, normal caproic acid, it is my preference to add a stoichiometric equivalent and conduct the reaction until the amount of water eliminated is equal to, or almost equal to, the theoretical yield. Hydroxyacetic acid may be employed in the same manner.

MONOCARBOXY ESTER OF HIGH MOLAL ETHERAMINO-POLYGLYCOL

Example 1

1 pound mole of the product described under the heading "High Molal Etheramino-Polyglycol, Example 3" is heated with 2 pound moles of isobutyric acid for approximately 8 to 18 hours at 150–155° C. The esterification is conducted by means of a hot condenser, that is, a condenser with the temperature regulated so as to be maintained at approximately 105° C. to 112.5° C. Such arrangement permits the elimination of much, if not all, of the water of esterification, but condenses and returns substantially all of the butyric acid for further reaction. The progress of the esterification reaction can be followed by the use of a second trap condenser to retain and measure the water of reaction. Such water should be titrated for determination of any acid which may have distilled over. At the end of such esterification period the excess butyric acid is eliminated by distillation, and if preferred, vacuum distillation may be employed. The final product is substantially free from uncombined butyric acid. The amount of base required for saponification of the ester, is, of course, a means of measuring the degree of esterification. Saponification re-liberates the butyric acid. The product shows excellent solubility in dilute acetic acid or dilute mineral acid. The product derived from commercial raw materials is an amber-colored, viscous or paste-like compound at ordinary room temperature, and if contaminated by the presence of metallic iron or the like, may show even a darker appearance. Salt forms are more solid in nature than the anhydro base. Such appearance is typical of the entire class of materials herein described.

MONOCARBOXY ESTER OF HIGH MOLAL ETHERAMINO-POLYGLYCOL

*Example 2*

The high molal etheramino-polyglycol described under the heading of Example 1, is substituted for the high molal etheramino-polyglycol used in the preceding example.

MONOCARBOXY ESTER OF HIGH MOLAL ETHERAMINO-POLYGLYCOL

*Example 3*

The same procedure is followed as in the preceding two examples, except that high molal etheramino-polyglycols having at least one ether linkage, and preferably, two ether linkages, and obtained by the use of glycide alone, or glycide in combination with ethylene oxide in the manner described in high molal etheramino-polyglycols, Examples 3 to 7, inclusive, are substituted for Examples 1 and 2 in the preceding example.

MONOCARBOXY ESTER OF HIGH MOLAL ETHERAMINO-POLYGLYCOL

*Example 4*

The same procedure is followed as in the two preceding examples, with the exception that instead of using 8 moles of the low molal acid per mole of etheramino-polyglycol, one employs only a single mole, i. e., sufficient low molal acid to convert only one hydroxyl radical into an ester radical. Under such circumstances, the yield may not be as large as in the preceding examples, and there may be some minor proportions of uncombined reactants remaining in the final product. This does not interfere with the use of the compounds for various purposes, as hereinafter described. One mole of anhydride may be used for 2 moles of etheramino-polyglycol.

MONOCARBOXY ESTER OF HIGH MOLAL ETHERAMINO-POLYGLYCOL

*Example 5*

Esterification is conducted by means of an acid having a substantially higher boiling point, such as normal caproic acid. Under such instances no excess of acid is necessarily added, and one may use either one mole of acid or 2 moles of acid, depending upon whether there are as many as 2 hydroxyl radicals present per mole of etheraminopolyglycol, and also depending upon whether or not one desires to convert both hydroxyl radicals, if present, into ester radicals. The temperature of esterification is approximately 175°–195° C. and the condenser employed is a cold condenser with suitable arrangement to trap the water of esterification, as formed, and also return any unreacted acid for further reaction. (Such arrangement is suitable where the acid is volatile and water-insoluble.) There is no difficulty in regard to the loss of the low molal acid, because, although it is volatile at the indicated temperature, yet it is readily condensable. Thus, as specific procedure illustrating the present example, one may use 1 mole of etheramino-polyglycol, Example 3, preceding, and 1 mole of caproic acid, or else, one mole of the other, previously employed etheramino-polyglycol; one may employ 2 moles of caproic acid in such instances where it is desired to convert both hydroxyl radicals into ester radicals.

MONOCARBOXY ESTER OF HIGH MOLAL ETHERAMINO-POLYGLYCOL

*Example 6*

The same procedure is employed as in the previous example, except that anhydrous hydroxyacetic acid is employed instead of caproic acid. One obtains the monohydroxyacetate of the high molal etheramino-polyglycol, Example 1, and one may obtain either the monohydroxyacetate or the di-hydroxyacetate, as previously explained, in the event other polyhydric amino-polyglycols are employed.

Previous reference has been made to high molal etheramino-polyglycols as reactants, for the reason that it is my preference to employ products in which there is at least one ether linkage obtained by the use of 2 or more moles of ethylene oxide per aminohydrogen atom. If desired, however, one may employ a single mole of the oxyalkylating agent, such as ethylene oxide, for each available amino hydrogen atom. In such event, the product obtained is not a polyglycol, but an aminoalcohol, insofar that there is a single alkylene radical present and no ether linkage. Such type of reactant may be employed in the present instance, if desired. Regardless of what type of reactant is employed, the final product is invariably soluble in or produces a colloidal salt in dilute acetic acid or dilute mineral acid. Completeness of reaction can be checked in each instance in the manner previously indicated.

In the case of hydroxyacetic acid, one may use a distinctly higher temperature without volatilization of the acid than in the instances where caproic acid is employed. For instance, the esterification involving hydroxy acetic acid may employ a temperature as high as 215° C.

Many of the preceding examples will be found to be soluble in water, even in the absence of acid. Some of the products are soluble in or produce a turbid sol or suspension in gasoline, kerosene, benzene, or cresol.

Previous reference has been made to the use of the anhydride as an acylating agent instead of the free acid. Probably salt formation is eliminated until esterification begins with liberation of a molecule of acid for each molecule of anhydride added. The liberated acid acts, of course, as if it had been added at the beginning of the reaction, and additionally, presents a modification, in that water is not eliminated, unless esterification takes place by virtue of the free acid. If, however, the entire esterification reaction involves only the anhydride and no acid, water would not be liberated. Thus, the measurement of the condensed water, if any, under such circumstances, is not necessarily an index of esterification. Other procedure must be used, although unfortunately, no method of measurement is available which is relatively quick and absolutely satisfactory to a precise and quantitative degree. If a salt is formed, titration with caustic soda or potash converts the salt into the free base. The particular end point, using the usual indicators, is rather indefinite, and thus, the use of additional alkali to determine the saponification value results in a determination of somewhat approximate value, due to such difficulties of analytical manipulation. The values obtained, however, even though only approximate, are perfectly satisfactory for the present purpose. Other suitable procedure, but more laborious, involves the saponification of the product, followed by acidification, with a non-volatile mineral acid, e. g., sulfuric acid and distillation of the low molal carboxy acids which were originally combined in ester form, followed by the usual volumetric procedure in correlation to the original sample.

The following reactions illustrate the formula of the high molal etheraminoalcohols and etheramino-polyglycols and also their esterification products without reference to the formation of the hydrated base or of a salt form of the anhydro base. In the subsequent structural illustrations where $R_1$ appears, it is assumed, for convenience, that $R_1$ in such instance as illustrated does not include a hydroxyl radical. Oxyalkylation under such circumstances must of necessity involve the aminohydrogen atom. Actually, it would not matter if the radical indicated by $R_1$ does contain a hydroxyl radical, for the reason that the linkage involving a hydrogen atom and an amino nitrogen atom, as contemplated in the herein described reactants, appears to be more susceptible to oxyalkylation than the hydrogen oxygen linkage of the hydroxyl group. After the first mole of oxyalkylating agent is introduced into the amino hydrogen position, whether it be ethylene oxide or glycide, the resulting radical is the equivalent of $R_1$ in such instances where $R_1$ does contain an alcoholic hydroxyl group. It would not matter if the next mole of oxyalkylating agent attacked the hydroxyl of $R_1$ or the hydroxyl of the alcoholic group which replaced the aminohydrogen atom. Stated in another way, if $R_1$ is a hydroxylated radical, then $R_2OH$ and $R_1$ would be the equivalent of each other, and $R_3COOH$ in the resulting esterification reaction would combine as readily in most instances with the $R_1$ radical as with the $R_2OH$ radical. One must not lose sight of the fact that esterification must involve a tertiary amine, and thus eliminate amidification as a possible reaction. If $R_1$ does contain an alcoholic hydroxyl and is reactive, and if the amine is the secondary amine, then in each instance the reaction must be conducted by the use of suitable quantities of an alkylating agent so as to eliminate the aminohydrogen atom.

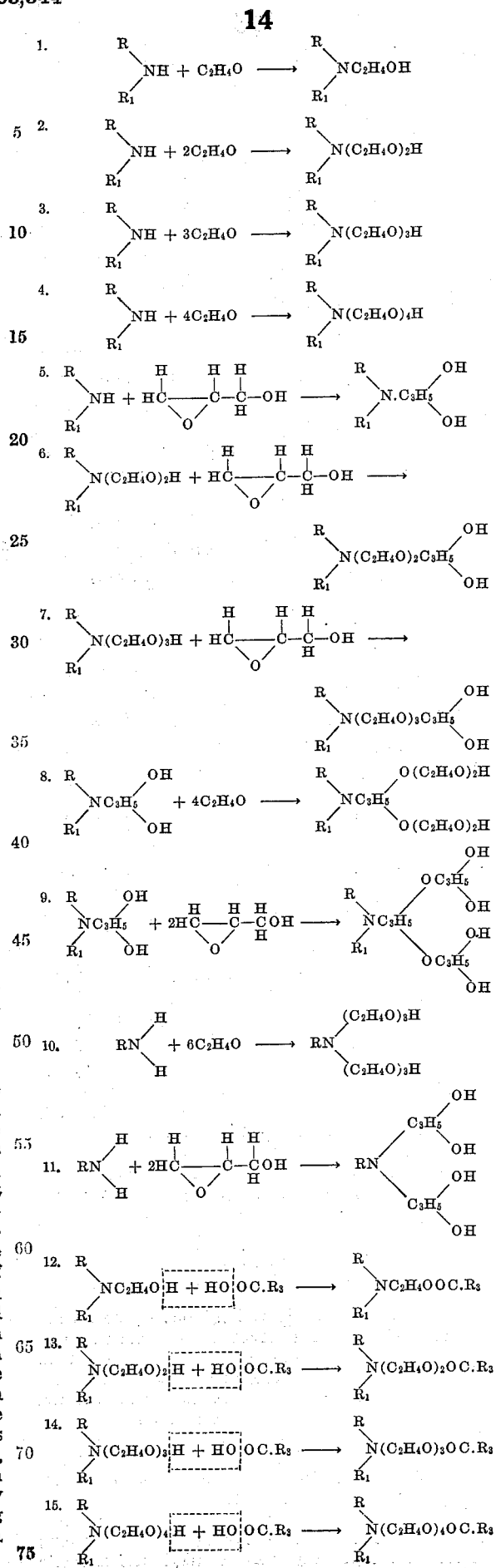

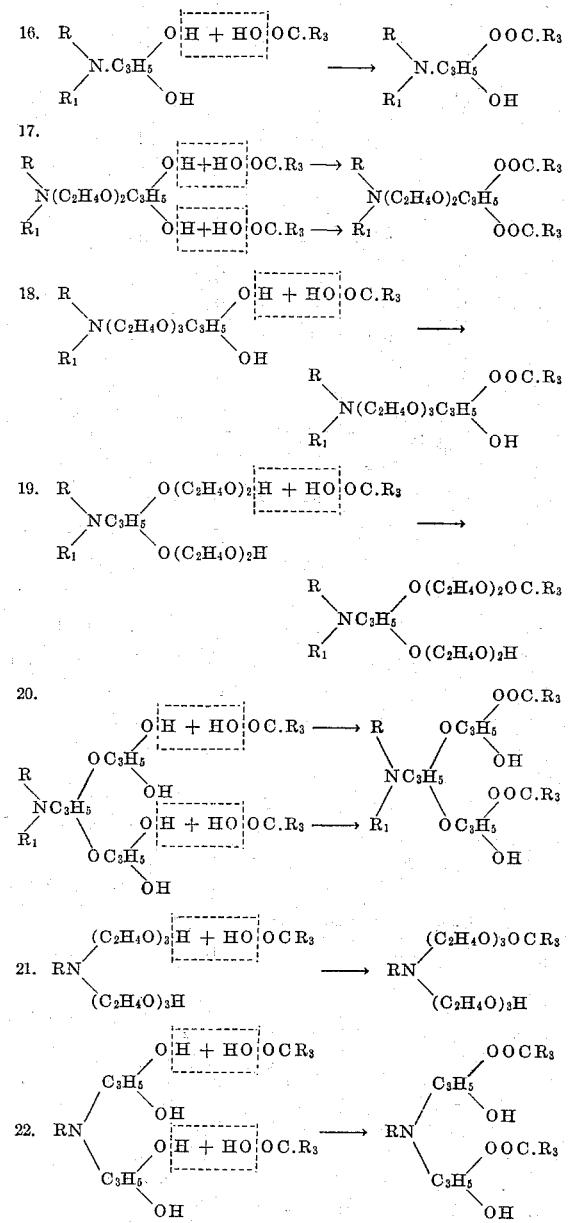

As will be noted, in such instances where butylene oxide replaces ethylene oxide, the number of carbon atoms in the polyglycol attached to the aminonitrogen H may be high as 15.

In light of the previous description and formulae, the structure of the compounds originally presented may be advantageously summarized as follows:

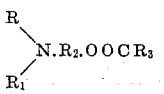

in which R is an ether radical having as an integral part thereof an hydrocarbon radical containing 8 carbon atoms and not more than 32 carbon atoms, and more particularly, an alkyl radical, an alicyclic-alkyl radical or an aralkyl radical in which a carbon atom chain is interrupted at least once by an oxygen atom and at least one such carbon atom attached to an ethereal oxygen atom is an acyclic carbon atom; $R_1$ is the same as R without the lower limitation of 8 carbon atoms, or $R_1$ may be any non-aryl hydrocarbon atom radical having 7 carbon atoms or less, and especially, alkyl, aralkyl, and alicyclic in character, or additionally, $R_1$ may be hydroxyalkyl, including hydroxyalkyl radicals, where the carbon atom chain is interrupted at least once by an oxygen atom, provided the alkylene radical of said immediately aforementioned alkyl and hydroxyalkyl radicals contain less than 8 carbon atoms; $R_2$ is a divalent radical having less than 16 carbon atoms and not more than 3 ether linkages, and a member of the class consisting of alkylene radicals, hydroxyalkylene radicals, alkyleneoxy radicals, hydroxyalkyleneoxy radicals, polyglycol and hydroxy polyglycol radicals, in which any alkylene radicals present are selected from the group consisting of ethylene, propylene, butylene, and methylbutylene, and $R_3CO$ is an acyl radical of a low molal monocarboxy acid having less than 8 carbon atoms, with the added proviso that at least one of the three radicals $R_1$, $R_2$ and $R_3$ shall have present an alcoholic hydroxyl radical.

In view of the lower cost of primary amines, in comparison with secondary amines, it is my preference to employ hydroxylated ether amines obtained by the oxyalkylation of primary amines, and particularly those in which the amine radical R is derived from higher fatty acids, and especially those having 18 carbon atoms.

Previous reference has been made to the use of a polycarboxy reactant. Such intermediate reactants are readily available and are produced by reactions involving suitably selected fatty compounds or their equivalents with typical polybasic carboxy acids, such as phthalic acid, succinic acid, malic acid, fumaric acid, citric acid, maleic acid, adipic acid, tartaric acid, glutaric acid, diphenic acid, naphthalic acid, tricarballylic acid, etc. Instead of acids one may, of course, use any functional equivalent, particularly the anhydride. The anhydride, as a primary reactant, when available, is a particularly suitable reactant when two carboxyl reactants are attached to adjacent carbon atoms. The most suitable acids are maleic, citraconic, and phthalic. They are conveniently used in the form of the anhydride. Acids having three or more carboxyl radicals may be used, but I prefer to use the dibasic carboxy acids. Hydroxylated polycarboxy acids may be employed, but I prefer to use the non-hydroxylated type, insofar that they are, generally speaking, more resistant to pyrolysis.

Another type of polybasic carboxy acid which may be employed is the so-called adduct type. For instance, maleic anhydride or its equivalent is reacted with a number of well-known types of reactants which contain conjugated double bonds and enter into the diene synthesis. The Diels-Alder adducts thus obtained represent suitable polybasic carboxy acids.

The somewhat similar adduct in the sense that it involves the use of maleic anhydride or its equivalent, is the Clocker adduct. This is obtained from unsaturated acids, alcohols, or the like which may have only one ethylene linkage, or is not conjugated in the event that more than one ethylene linkage is present. The adduct is obtained at a distinctly higher temperature than the Diels-Alder adduct and appears to be acyclic. Cyclobutane structures may also be involved. In the event either type of adduct is obtained from a detergent-forming monocarboxy acid, particularly a higher fatty acid such as the fatty acids derived from China-wood oil or linseed oil, the product so obtained is not considered as a detergent-forming acid derivative or a higher fatty derivative in the present instance.

It has been previously pointed out that the acylated aminoalcohols employed as reactants must have present a reactive alcoholic hydroxyl radical and may have present more than one such hydroxyl radical, and two, three, or even more. In light of this fact, it is obvious that one may produce monomeric compounds comparable to dibutyl phthalate or linear polymers free from cross-linking as obtainable from ethylene glycol and phthalic anhydride, or else compounds in which cross-linking can take place to a greater or lesser degree, such as those obtainable from glycerol and phthalic anhydride. In any event, the final products obtained by esterification, must represent monomeric compounds, or else polymeric compounds comparable to an A stage, or a B stage resin, i. e., either they must still be fusible or soluble in selected solvents, or both. They must not represent the insoluble, infusible C stage resin.

Esterifications of this type are used so generally that further description appears unnecessary. The alcoholic reactant, i. e., the aminoglycol, is usually a fairly viscous or semi-solid material per se. Reaction with polybasic carboxy acid derivatives, as described, produces substances which may be viscous liquids, balsams or hard solids, but in any event, they are sub-resinous in the sense that they have not reached what is commonly termed the C stage.

Esterification reactions, of course, are conducted in such a manner that an active carboxyl group or its equivalent is present and another compound having an available active hydroxyl group. The reactions may be, and frequently are, catalyzed by the addition of a small amount of free acid, such as dry hydrochloric acid, or a few per cent or less of an aromatic sulfonic acid, such as paratoluene sulfonic acid. The temperature employed is above the boiling point of water, for instance, 160° to 180° C., or even higher, provided there is no pyrolysis. The reaction goes to completion by virtue of the fact that water of esterification or its equivalent is removed. Such water may be removed in any suitable manner, such as the passage of dry nitrogen gas, or by the use of an inert solvent such as xylene or decalin. The progress of the reaction can be checked by determination of the amount of free acid present. Such esterification procedure or other esterification procedure, which is readily available for use in the instant case, is described in numerous patents.

Since the herein described compositions of matter, and particularly those employed as a demulsifying agent, are obtained by esterification reactions involving an acidic fractional ester, as previously described, and since such fractional ester, in turn, is derived by esterification reactions between (I) Compounds containing a detergent-forming monocarboxy acid; and
(II) A polybasic carboxy acid, it is necessary that either (I) or (II) contain an alcoholic hydroxyl group. Such alcoholic hydroxyls are present in some detergent-forming acid molecules, and when such acids are employed, they may be esterified directly by the polybasic acid. Obviously, the esters, salts, and other derivatives of such acids which leave the hydroxyl part of the oxyacyl group intact, may also be employed. Examples of suitable hydroxy detergent-forming acids or their functional equivalents are: hydroxystearic acid, ricinoleic acid, trihydroxypalmitic acid, hydroxynaphthenic acid, tridihydroxystearin, triricinolein, butyl ricinoleate, ethyl dihydroxystearate, ethylene glycol diricinoleate, etc. Hydroxylated polybasic carboxy acids may react with any high molal acids.

In some cases it is desirable to form a partial ester of these hydroxy detergent-forming acids with a polyhydric alcohol to yield a compound having more than one hydroxyl group available for reaction with the polybasic acid. Examples of such esters are: glyceryl monoricinoleate, glyceryl diricinoleate, ethylene glycol monodihydroxy stearate, diethylene glycol monohydroxy stearate, sorbitol dihydroxy stearate, etc.

In addition to the common higher fatty acids and other detergent-forming acids described above, the present invention is intended to include, for the manufacture of the intermediates, the use of fatty acids and partial esters of fatty acids obtained by the drastic oxidation of non-drying and semi-drying oils, such as castor oil, sunflowerseed oil, cottonseed oil, rapeseed oil, soyabean oil, etc. Acids and esters prepared from such blown or drastically-oxidized oils, are regular articles of commerce obtainable on the market. Other detergent-forming acids suitable for preparing the present demulsifying agents, may be prepared by blowing or oxidizing unsaturated fatty acids, such as castor oil fatty acids, soyabean fatty acids, oleic acid and the like.

When the detergent-forming acid itself does not contain an alcoholic group, it may be reacted with a polyhydric alcohol to yield a partial ester having one or more residual hydroxyls available for esterification with a polybasic acid. Note what has been said in regard to reaction with hydroxylated polycarboxy acids.

Conversely, the polybasic acid used may first be esterified with the polyhydric alcohol to yield esters having unreacted hydroxy groups available for esterification of the detergent-forming acid.

If the detergent-forming material does not contain an alcoholic hydroxyl radical, I have found that the reaction is usually easier to control, in order to obtain the desired final products if the polyhydric alcohol intended to be used is first reacted with the detergent-forming acid, and the fractional ester so obtained subsequently reacted with the polybasic acid.

Examples of polyhydric alcohols which may be employed to bring about ester formation between detergent-forming acids and polybasic acids are: glycerol, diglycerol, alpha, beta, gamma butanetriol, beta methyl glycerol, ethylene glycol, diethylene glycol, triethylene glycol, 1,3-propane diol, isobutylene glycol, ethylene glycol glycerol ether, diglycerol monoethylene glycol ether, mannitol, sorbitol, sorbitan, mannitan, sorbitol monobutyl ether, erythritol, mannitol, dihydroxy thiophene, etc.

For the purpose of this invention, polyhydroxy amines are considered the functional equivalents of polyhydroxy alcohols. Examples of such compounds are: monoglycerylamine, triethanolamine, diethanolamine, phenyldiethanolamine, dicyclohexanolamine, cyclohexylpropanolamine, benzyldiethanolamine, pentanolamine, diethanolmethylamine, tripropanolamine, etc. Ethers derived from this class of compounds or in combination with the previously mentioned diols, triols, etc., are included.

It should be pointed out that the hydroxy esters conveniently employed for reaction with polybasic acids to form the intermediates of the present invention, need not necessarily be prepared by reacting the detergent-forming acid with the polyhydric alcohol directly. In many instances, it is more convenient to prepare these hydroxy esters by re-esterification of fats, oils, drastically-oxidized oils, or detergent-forming acid esters with polyhydric alcohols. For example, a fat such as stearin may be re-esterified with glycerin to form glycerol monostearate, which may be subsequently reacted with a polybasic acid. The preparation of such fractional esters derived from fats, oils, and drastically-oxidized oils, is well known, and the products are sold commercially under various names. Similar products may be obtained by re-esterification of the oils, fats, drastically-oxidized oils, and detergent-forming acid esters with other polyhydric alcohols, such as glycols, sorbitol, mannitol, polyhydroxyamines, or other polyhydric alcohols; and such products may be conveniently employed for the manufacture of the demulsifying agents of the present process. Analogous partial esters are obtained from rosin acid, naphthenic acid, and the like.

Often it is convenient to perform the re-esterification simultaneously with the esterification of the polybasic acid. For example, a mixture of a fatty oil, a polyhydric alcohol, and a polybasic acid may be mixed and heated together to yield an intermediate. If a hydroxylated oil, such as, for example, triricinolein, is employed, then one need not add a polyhydric alcohol unless desired.

The formation of one kind of intermediate contemplated for use according to my invention, may be exemplified by the esterification reaction between a polybasic acid and ricinoleic acid. In this case the detergent-forming acid compound contains a single hydroxyl group, and the reaction obviously will yield a simple ester containing a residual carboxylic acid group, but no residual hydroxyl groups.

The formation of a second type of product may be exemplified by the reaction between ethylene glycol monostearate and a polybasic acid. In this case, as well, the result of reaction is a simple ester containing one or more residual carboxyl groups.

My preferred reactants of the acidic fractional ester type, are derived from castor oil and phthalic anhydride. Such compositions per se are old. For instance, see U. S. Patent No. 2,166,432, dated July 18, 1939, to De Groote, page 4 from the heading "Intermediate amine, Example 9," to page 5 heading "Composition of matter, Example 1." See U. S. Patent No. 2,166,433, dated July 18, 1939, to De Groote, page 4 from the heading "Intermediate amine, Example 8," to page 7 heading "Composition of matter, Example 1."

If triricinolein be indicated by the following formula:

(A)    OH.R.COO.CH₂
       |
       OH.R.COO.CH
       |
       OH.R.COO.CH₂ then reaction products of phthalic anhydride or phthalic acid may be indicated in the following manner, although for purposes of convenience, phthalic acid is not shown in the form of the usual isomer, where, of course, the two carboxyl radicals are attached to adjacent carbon atoms:

(B) 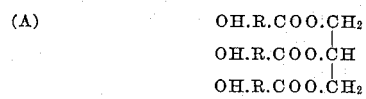

(C)

(D)

(E)

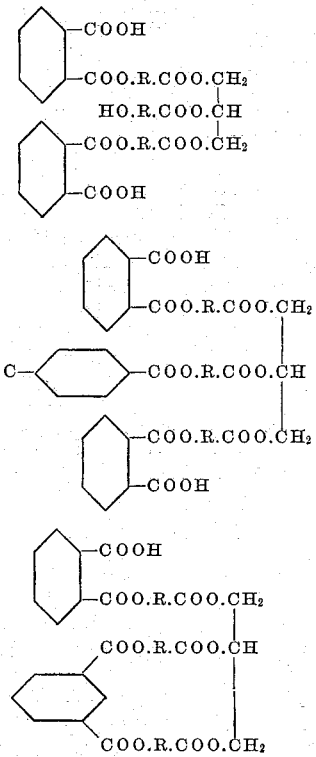

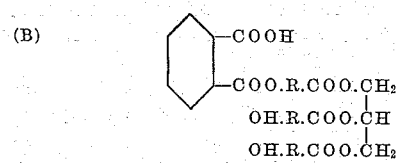

A large number of related products immediately present themselves, for instance, esters derived by reaction with ricinoleic acid, hydroxystearic acid, dihydroxystearic acid, and the like; or the corresponding esters derived from glycols or glycol ethers, such as ethylene glycol or diethylene glycol, which contain no free hydroxyl radicals attached to the glycol radical or residue. Similarly, one might have products derived from monohydric alcohols, for instance, ethyl ricinoleate, propyl ricinoleate, sodium ricinoleate, amylamine hydroxystearate, etc. It is intended to include blown oils.

In the examples shown above, where the ester is polybasic, for instance, compounds of the type exemplified by C and D above, one might remove the acidity of one of the carboxylic hydrogen atoms or two of the carboxylic hydrogen atoms, in any feasible manner, that is, by neutralization with an alkali or by conversion into an ester involving reaction with a new kind of an alcohol, i. e., a monohydric, dihydric, trihydric, etc.

In the case of D above, two carboxylic hydrogens may be neutralized. In any event, however, the material derived by reaction between a polybasic acid and its functional equivalent and a hydroxylated fatty material of the kind described, is characterized by the presence of at least one free carboxyl radical.

Where reference is made to ricinoleic acid, hydroxystearic acid, dihydroxystearic acid, a hydroxy fatty acid, and the like, it is evident that certain simple derivatives, such as the halogenated compounds, etc. are the obvious functional equivalents; for instance, chlorinated triricinolein, may be employed instead of triricinolein. Brominated ricinoleic acid might be employed instead of triricinolein. Brominated ricinoleic acid might be employed instead of ricinoleic acid. In these instances the hydroxylated fatty material, notwithstanding modifications of the kind indicated, still has the same functional properties as the unmodified hydroxylated fatty material, and thus acts in the same manner, as far as producing an effective demulsifying agent is concerned. In the hereto appended claims, reference to a hydroxylated fatty material includes such obvious functional equivalents.

The second of the aforementioned De Groote patents describes such materials as diphthalated diricinolein dimaleated monostearin, dioxalated monoabietin, dicitrated mononaphthenin, etc.

In such instances where phthalic anhydride or the like is reacted with ricinoleic acid, hydroxystearic acid, etc., to form a fractional ester, such fractional ester is reacted further with the hydroxylated amino-alcohol without limitation as to whether the carboxyl group of the phthalic acid radical or the carboxyl group of the higher fatty acid radical is involved.

Although the compounds or compositions of matter herein described may be obtained in any suitable manner, it is obvious that having obtained a hydroxylated aminoalcohol of the kind described, all that one need to do is to react such compound with the acidic fractional ester of the kind previously described, in order to produce compositions of the kind herein contemplated. Such reactions are illustrated by the following examples:

COMPOSITION OF MATTER

Example 1

A high molal etheraminopolyglycol is prepared in the manner previously described by reacting one mole of a monohydroxylated amine of the formula:

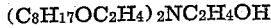

with one mole of glycide and 2 moles of ethylene oxide. The dihydroxylated compound thus obtained is esterified with one mole of normal caproic acid in the manner previously described. The ester so obtained is reacted with one additional mole of glycide by the same procedure as has been described in detail for the unesterified aminoalcohols. The resultant contains one ester group and 2 unreacted hydroxyl radicals.

Such intermediate product is esterified with one pound mole of the dibasic ester obtained by reacting one mole of castor oil with 2 moles of phthalic anhydride. Such product is essentially triricinolein diacid phthalate. The reaction is conducted at approximately 165–195° C. until analysis shows that one carboxyl has been eliminated by esterification. A thick amber colored mass, substantially viscous or somewhat solid in nature, is obtained. In any event, esterification may be carried a little farther, or perhaps not quite so far, but in any event, the final sub-resinous mass must represent an A or a B stage resin, as differentiated from the insoluble and infusible C stage resin.

COMPOSITION OF MATTER

Example 2

One pound mole of an amine of the following structure:

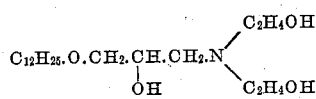

is reacted with 1 pound mole of normal caproic acid in the manner previously described, and then with 1 pound mole of the castor oil phthalic anhydride derivative in the same manner as in Example 1, immediately preceding. As pointed out, said derivative is essentially a triricinolein diacid phthalate.

COMPOSITION OF MATTER

Example 3

An amine of the following composition:

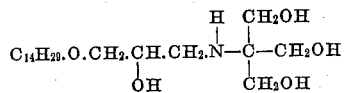

is substituted for the amine employed in Example 2, preceding.

COMPOSITION OF MATTER

Example 4

An amine of the following composition:

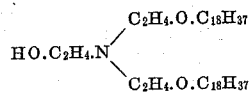

is substituted for the amine employed in Example 1, preceding.

COMPOSITION OF MATTER

Example 5

An amine of the following composition:

is reacted with 2 moles of ethylene oxide in the manner previously described, and then with 1 mole of normal caproic acid by the same procedure, as employed previously. The ester so obtained is then treated with 1 pound mole of glycide so as to form a dihydroxylated resultant. Thereafter, the same procedure is employed as previously described in Example 1, to wit, reaction in equimolar proportion until 1 carboxyl has been eliminated by esterification.

COMPOSITION OF MATTER

Example 6

The same procedure is followed as in Examples 1 to 5, preceding, except that anhydrous hydroxyacetic acid or isobutyric acid is substituted for normal caproic acid.

COMPOSITION OF MATTER

Example 7

The same procedure is followed as in Examples 1 to 6, immediately preceding, except that the analogous derivative of maleic anhydride, adipic acid, citraconic anhydride, succinic acid, or some other polybasic acid, particularly a dibasic acid, is substituted for the phthalic acid derivative in the preceding examples. If the reaction involved the use of an acid instead of an anhydride, then such reaction can be conducted in the presence of an inert solvent such as xylene, decalin, etc., which removes the water in a slow but continuous manner.

COMPOSITION OF MATTER

Example 8

Preceding examples are repeated, except that polyhydroxylated reactants are used exclusively, and in each instance the polybasic acids are employed in such molar proportion that there is one mole of the dicarboxy ester employed for each available hydroxyl radical present in the hydroxylated etheramino-polyglycol. One mole of the etheramino-polyglycol is used. Complete reaction produces a compound with a plurality of unreacted carboxylic radicals.

COMPOSITION OF MATTER

Example 9

The same reactants are employed as in Composition of matter, Examples 1 to 8, preceding, except that the molal ratio is so changed that the available carboxylic radicals are just sufficient to combine with the available hydroxyl radicals. For instance, if the hydroxylated ether-amino-polyglycol contains one hydroxyl radical, than 2 moles of such product are reacted with 1 mole of the dibasic ester. Reaction is continued until both carboxyl radicals of the dibasic ester are eliminated.

COMPOSITION OF MATTER

Example 10

Compositions of matter exemplified by Examples 1 to 8, preceding, are reacted with glycerol under substantially the same esterification conditions as previously described. The amount of glycerol added may vary from an equimolar ratio to a ratio where there is 1 mole of glycerol added for each residual carboxyl radical present. Such products are particularly apt to give highly viscous or amorphous materials. When prepared in iron apparatus, the products are invariably of a deep red or amber color.

COMPOSITION OF MATTER

Example 11

Compositions of matter exemplified by Examples 1 to 8, preceding, are repeated, except that other suitable fractional esters derived from non-hydroxylated higher fatty acids are employed instead of esters of triricinolein. For instance, the dicarboxy ester derived by reaction between 1 mole of monostearin and 2 moles of phthalic anhydride is substituted for triricinolein diacid phthalate. Similarly, pentaerythritol is reacted in equal molar proportion with stearic acid to give the monostearate. Such ester is then reacted with 3 moles of phthalic anhydride, in order to obtain the triacid phthalate. Such product is substituted for triricinolein triphthalate in the preceding examples.

In order to illustrate derivatives obtained by reaction between a polybasic carboxy acid fractional ester, and more particularly, a dibasic carboxy acid fractional ester and an esterified ether aminoalcohol of the kind described, the following formulae, along with indicated reactions, are included. Previous reference has been made to $R_3.COOH$ being a low molal monocarboxy acid. In some instances such acid might contain an alcoholic hydroxyl group, as in the case of lactic acid, hydroxyacetic acid, etc. For convenience, in the formulae appearing immediately hereafter, $OHR'_3.COOH$ is intended to refer specifically to the low molal monocarboxy acid having an alcoholic hydroxyl radical. $R_4(COOH)_n$ represents the polybasic acid in which $n$ represents a small whole number such as 2 or 3. For convenience, the formulae are limited to the dicarboxy type, $HOOC.R_4.COOH$. The formulae are based on reactions involving equimolar quantities, except in the last two instances, where two moles of the dicarboxy acid are used for each mole of dihydric ether aminoalcohol. In examining the structural formulae immediately following, attention is directed to what has been said previously in regard to the esterification of the aminoalcoholic body with a monocarboxy acid when $R_1$ did contain a hydroxyl radical. An analogous situation applies in the instant case, where the hydroxylated monocarboxy acid ester is subjected to reaction of a polycarboxy acid or derivative. It appears unnecessary to repeat what has been said, except to point out that isomers or more complex structures may be involved when $R_1$ contains one or more alcoholic hydroxyl radicals.

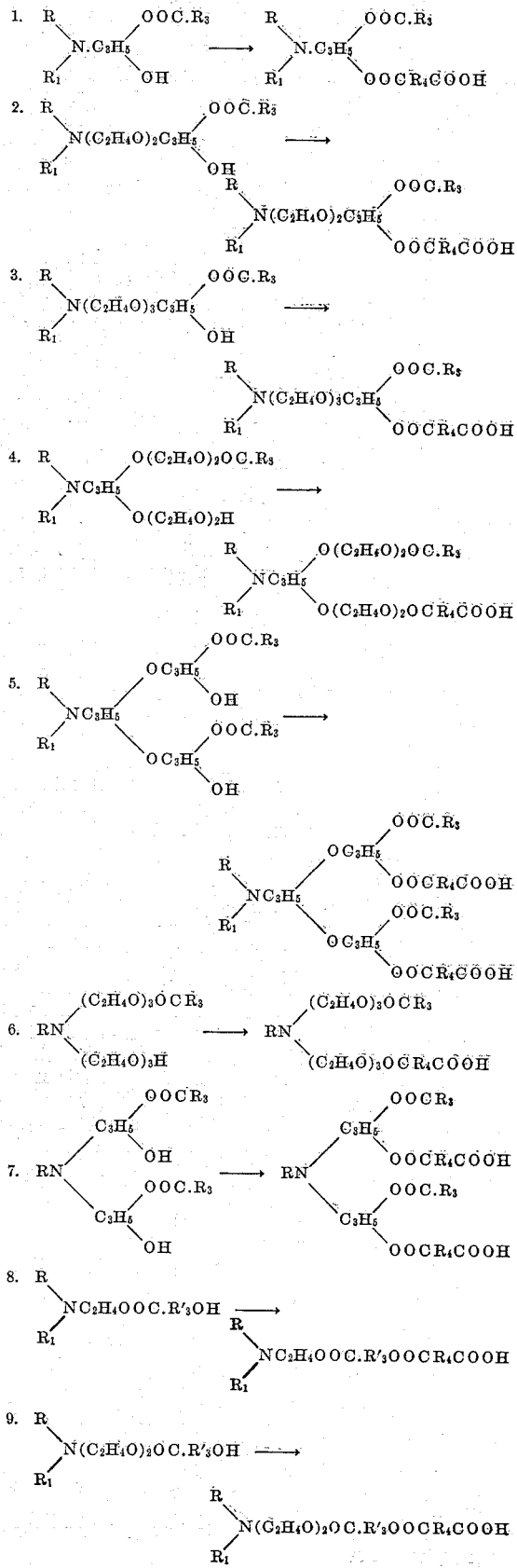

10. 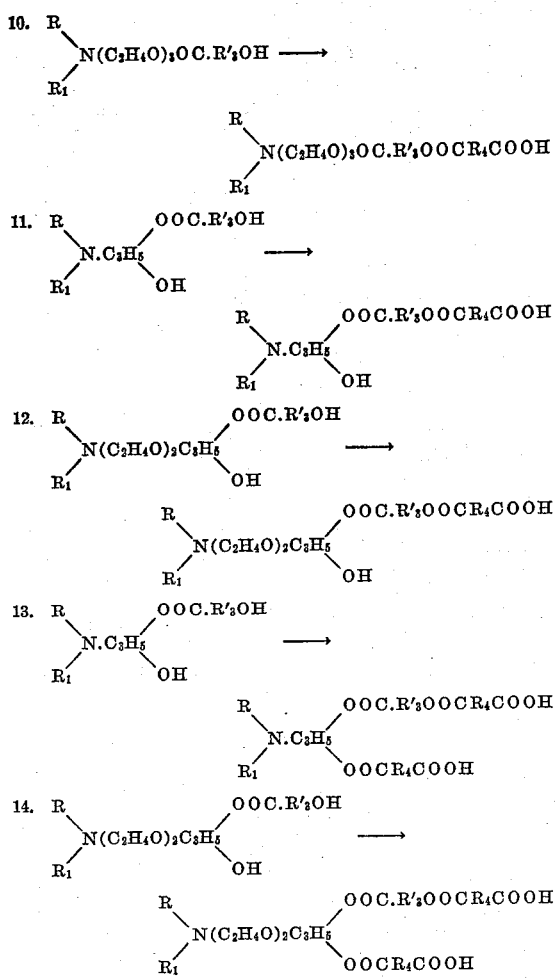

11.

12.

13.

14.

Previous reference has been made to the formula:

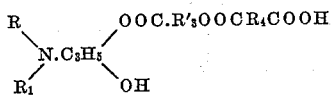

Examination reveals that reaction may have involved the other available hydroxyl radical, thus resulting in a compound of the following formula:

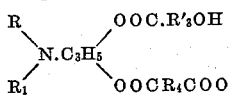

This also is true in regard to the following compound previously depicted and its isomer.

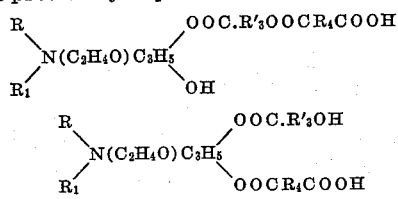

Any of the previous compounds illustrate hydroxy acids which may undergo condensation polymerization, and thus form compounds of increased molecular weight. Compare with the formation of linear polymers, for example, from ethylene glycol monoacid phthalate. Trihydric alcoholic structures or the use of a tribasic acid would lead to cross-linking.

In any event, the formation of the polymers may be indicated as a derivative of the prior compound of the formula:

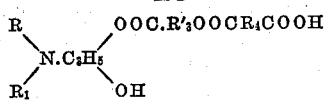

in the following manner:

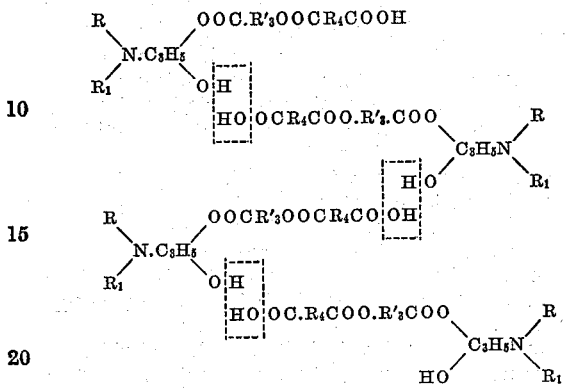

In the above presentation, re-esterification has been ignored.

The esterified hydroxylated ether amino-glycol of the kind previously described must contain at least one, and preferably more than one, alcoholic hydroxyl radical. Such reactant may be considered for the sake of simplicity as being in the class of an alcohol, i. e., a monohydric or polyhydric alcohol. If an alcohol is indicated by the formula $Y'(OH)_n$ where $n$ indicates the number 1 or more, and if a polybasic acid body be indicated by the formula $X'(COOH)_n$, where $n$ indicates the number 2 or more, then the reaction between a monohydric alcohol and a polybasic acid will result in a compound which may be indicated by the following formula: $YX(COOH)_{n'}$, where $n'$ indicates the number 1 or more, and which is, in reality, a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body would be polybasic in nature, for instance, if one employed a diphthalate or a triphthalate, then examination reveals that the formulae might result in a combination in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals, or there might be both. This is indicated by the following:

$$(Y.X)_q(OH)_{n'}$$

$$(Y.X)_q(COOH)_{m'}$$

$$(OH)_{n''}(YX)_q(COOH)_{m''}$$

in which $q$ indicates a small whole number (one in the case of a monomer, and probably not over 20, and usually less than 10), and $m'$ and $n'$ indicate the number 1 or more, and $m''$ and $n''$ indicate zero or a small or moderately-sized whole number, such as zero, one or more, but in any event, probably a number not in excess of 40. Naturally, each residual hydroxyl could combine with a phthalic acid radical or its equivalent, or with a tribasic acid radical, such as one derived from citric acid; and in such event, there would be a large number of free or uncombined carboxyl radicals present, possibly 1 to 20, or more. Actually, the preferable type of reagent would be more apt to include less than 10, and, in fact, less than 5 free hydroxyl radicals. It is not necessary to remark that the residual carboxyl radicals can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexylamine, benzylamine, aniline, toluidine, etc. Conversion into the ester, would be by means of a monohydric alcohol, such as methyl alcohol, ethyl alcohol, propyl alcohol, butyl alcohol, hexyl alcohol, octyl alcohol, decyl alcohol, ethylene glycol, diethylene glycol, glycerol, diglycerol, triethylene glycol, or the like. One could employ an amino alcohol so as to produce an ester.

If a tricarboxy acid derivative such as citric acid, is employed, then at least theoretically, two moles of the hydroxylated esterified etheramino-glycol derivative might react with 1 mole of the citric acid compound. Similarly, as has already been pointed out, a large number of molecules of a polybasic acid compound might combine with a single molecule of a highly hydroxylated esterified aminoglycol. For practical purposes, however, we have found that the most desirable products are obtained by combinations, in which the ratio of aminoalcohol derivative to the polybasic acid is within the ratio of 3 to 1 and 1 to 5, and in which the molecular weight of the resultant product does not exceed 10,000, and is usually less than 5,000, or preferably, less than 3,000. This is particularly true, if the resultant product is soluble to a fairly definite extent, for instance, at least 5%, in some solvent such as water, alcohol, benzene, dichlorethyl ether, acetone, cresylic acid, or the like. This is simply another way of stating that it is preferable, if the product be one of the sub-resins, which are commonly referred to as an A resin, or a B resin, as distinguished from a C resin, which is a highly infusible, insoluble resin. (See Ellis, Chemistry of Synthetic Resins, 1935, p. 862, et. seq.)

In recapitulating what has been said previously, the sub-resinous, semi-resinous, or resinous product herein contemplated may be indicated by the following formula:

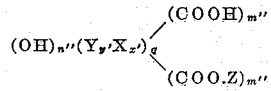

in which the characters have their previous significance, and $y'$ represents a small whole number not greater than 3, and $x'$ represents a small whole number not greater than 5; Z represents a hydrogen ion equivalent, such as a metallic atom, organic radical, etc.

Reference to an amine and amino compound is intended to include the salts and the anhydro base, as well as the hydrated base, since both obviously are present when a water-containing emulsion is treated with an amine or amino compound.

"In an aqueous solution of the amine the anhydro base, R—NH₂, the hydrated base,

and the two ions are all present." (Richter, v. s. p. 252.)

In the hereto appended claims reference to radicals derived from olefine oxides is intended to include glycide. In other words, in the case of propylene oxide, it is intended that hydroxy propylene oxide be included.

Materials of the kind herein contemplated are useful as wetting detergents and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles, such as sewage, coal washing waste water, and various trade wastes, and the like; as germicides, insecticides, emulsifiers for cosmetics, spray oils, water-repellent textile finish, etc. These uses are by no means exhaustive. The most important use of the present invention, as far as industrial application goes, is concerned with the use of materials previously described as demulsifiers for water-in-oil-emulsions, and more specifically, emulsions of water or brine in crude petroleum.

I have found that the chemical compounds herein described, which are particularly desirable for use as demulsifiers, may also be used as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote & Keiser. As to using compounds of the kind hereindescribed as demulsifiers, or in particular as surface tension depressants, in combination with mineral acid or acidization of oil-bearing strata, reference is made to U. S. Patent No. 2,233,383, dated February 25, 1941, to De Groote & Keiser.

The new compounds herein described are of utility, not only for the purposes specifically enumerated in detail, but also find application in various other industries, processes, and for various uses where wetting agents of the conventional type are used. As to some of such additional uses which are well known, see "The expanding application of wetting agents," Chemical Industries, volume 48, page 324 (1941).

Reference is made to co-pending applications Serial Nos. 579,498, 579,499, 579,500, 579,501, and 579,502, filed February 23, 1945.

Since the herein contemplated products are esters, it is hardly necessary to point out that saponification decomposes the product into its original components, to wit, an amine and an acid or acids. Actually, the acids are obtained in the form of salts, usually, the sodium or potassium salts. Such conversion into the original components or simple modifications thereof results in products which can be examined in the customary manner, and thus serve to identify the esterified amine alcohol.

Having thus described my invention, what I claim as new and desire to secure by Letters Patent is:

1. A sub-resinous esterification product of the formula:

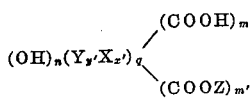

in which X is a polycarboxy acid fractional ester radical having (a) an unreacted carboxyl radical, and (b) a detergent-forming monocarboxy acid radical having at least 8 and not more than 32 carbon atoms, said detergent-forming acid radical being an integral part of a detergent-forming acid compound of the class consisting of acids, monohydric alcohol esters and polyhydric alcohol esters, and consisting of acids, monohydric alcohol esters and polyhydric alcohol esters; and $y'$ is a number from 1 to 3, inclusive; and $x'$ is a number from 1 to 5, inclusive; and $n$, $m$ and $m'$ are numerals from 0 to 40, inclusive; $q$ is a number from 1 to 20, inclusive; Z is a hydrogen ion equivalent; Y is the radical of a basic esterified aminoalcohol of the formula:

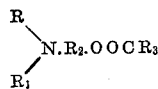

in which R is an ether radical having as an integral part thereof a hydrocarbon radical containing 8 carbon atoms and not more than 32 carbon atoms, and selected from the class consisting of alkyl radicals, alicyclic-alkyl radicals, and aralkyl radicals, in which a carbon atom chain is interrupted at least once by an oxygen atom and at least one such carbon atom attached to an ethereal oxygen atom is an acyclic carbon atom; $R_1$ is a member of the class of radicals consisting of (a) the same radical as R without the lower limitation of 8 carbon atoms; (b) non-aryl hydrocarbon radicals having 7 carbon atoms or less, and in turn, selected from the group consisting of alkyl radicals, aralkyl radicals and alicyclic radicals; (c) hydroxyalkyl radicals and hydroxyalkoxy radicals, in which the alkylene radical contains less than 8 carbon atoms; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxypolyglycol radicals, in which any alkylene radicals present are selected from the group consisting of ethylene, propylene, butylene, and methylbutylene, and $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

2. The new composition of matter described in claim 1, wherein the polybasic acid radicals are limited to the dicarboxy species.

3. The new composition of matter described in claim 1, wherein the polybasic acid radicals are limited to the dicarboxy species, and in which there is at least one alcoholic hydroxyl radical present as part of the radical $R_1$.

4. The new composition of matter described in claim 1, wherein the polybasic carboxy acid is phthalic acid and in which there is at least one alcoholic hydroxyl radical present as part of the radical $R_1$.

5. The new composition of matter described in claim 1, wherein the polybasic carboxy acid is maleic acid and in which there is at least one alcoholic hydroxyl radical present as part of the radical $R_1$.

6. The new composition of matter described in claim 1, wherein the polybasic carboxy acid is citraconic acid and in which there is at least one alcoholic hydroxyl radical present as part of the radical $R_1$.

7. In the manufacture of the new chemical product described in claim 1, the step of esterifying a basic esterified aminoalcohol of the formula:

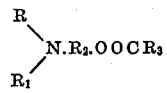

in which R is an ether radical having as an integral part thereof a hydrocarbon radical containing 8 carbon atoms and not more than 32 carbon atoms, and selected from the class consisting of alkyl radicals, alicyclicalkyl radicals, and aralkyl radicals, in which a carbon atom chain is interrupted at least once by an oxygen atom and at least one such carbon atom attached to an ethereal oxygen atom is an acyclic carbon atom; $R_1$ is a member of the class of radicals consisting of (a) the same radical as R without the lower limitation of 8 carbon atoms; (b) non-aryl hydrocarbon radicals having 7 carbon atoms or less, and in turn, selected from the group consisting of alkyl radicals, aralkyl radicals and alicyclic radicals; (c) hydroxyalkyl radicals and hydroxyalkoxy radicals, in which the alkylene radical contains less than 8 carbon atoms; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxypolyglycol radicals, in which any alkylene radicals present are selected from the group consisting of ethylene, propylene, butylene, and methylbutylene, and $R_3CO$ is an acyl radical of a low molal monocarboxy acid having less than 8 carbon atoms; with the added proviso that at least one of the three radicals, $R_1$, $R_2$ and $R_3$ shall have present an alcoholic hydroxyl radical, with a polycarboxy acid fractional ester having (a) an unreacted carboxyl radical; and (b) a detergent-forming monocarboxy acid radical having at least 8 and not more than 32 carbon atoms; said detergent-forming acid being an integral part of a detergent-forming acid compound consisting of acids, monohydric alcohol ester and polyhydric alcohol esters.

MELVIN DE GROOTE.